(12) United States Patent
Kimura et al.

(10) Patent No.: US 9,419,498 B2
(45) Date of Patent: Aug. 16, 2016

(54) ROTARY ELECTRIC MACHINE

(75) Inventors: Mamoru Kimura, Tokyo (JP); Akiyoshi Komura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 348 days.

(21) Appl. No.: 14/127,629

(22) PCT Filed: Jun. 30, 2011

(86) PCT No.: PCT/JP2011/065093
§ 371 (c)(1),
(2), (4) Date: Feb. 14, 2014

(87) PCT Pub. No.: WO2013/001645
PCT Pub. Date: Jan. 3, 2013

(65) Prior Publication Data
US 2014/0152154 A1   Jun. 5, 2014

(51) Int. Cl.
*H02K 9/08* (2006.01)
*H02K 9/10* (2006.01)

(52) U.S. Cl.
CPC ... *H02K 9/08* (2013.01); *H02K 9/10* (2013.01)

(58) Field of Classification Search
CPC .............. H02K 9/02; H02K 9/06; H02K 9/08
USPC .............. 310/52, 54, 57, 58, 59, 60, 62, 60 A
See application file for complete search history.

(56) References Cited

U.S. PATENT DOCUMENTS

| 3,684,906 A | * | 8/1972 | Lenz | H02K 17/16 310/61 |
| 4,609,840 A | * | 9/1986 | Eats | H02K 9/00 310/216.016 |
| 6,239,520 B1 | * | 5/2001 | Stahl | H02K 9/06 310/156.29 |
| 6,570,276 B1 | * | 5/2003 | Morel | H02K 9/06 310/52 |
| 7,994,666 B2 | | 8/2011 | Kori et al. | |
| 2002/0070615 A1 | | 6/2002 | Jakoby et al. | |

FOREIGN PATENT DOCUMENTS

| CN | 102013745 A | 4/2011 |
| JP | 55-41197 A | 3/1980 |
| JP | 55-79665 U | 6/1980 |
| JP | 57-166850 A | 10/1982 |
| JP | 2002-119018 A | 4/2002 |
| JP | 2007-97325 A | 4/2007 |
| JP | 2009-38864 A | 2/2009 |

OTHER PUBLICATIONS

International Search Report dated Sep. 20, 2011 with English translation (five (5) pages).

* cited by examiner

*Primary Examiner* — Hanh Nguyen
(74) *Attorney, Agent, or Firm* — Crowell & Moring LLP

(57) ABSTRACT

A rotary electric machine according to the present invention includes a stator including a stator core and stator coils, a rotor provided rotatably with a gap to the stator, a housing that stores the stator and the rotor, a fan that circulates air inside the housing through the gap in the housing, a heat exchanger that cools the air circulated by the fan, and an air guiding plate including an air guiding route formed therein for guiding the air cooled by the heat exchanger such that the cooled air flows into the gap without coming into contact with the stator coils.

15 Claims, 15 Drawing Sheets

*FIG. 1*
FIRST EMBODIMENT
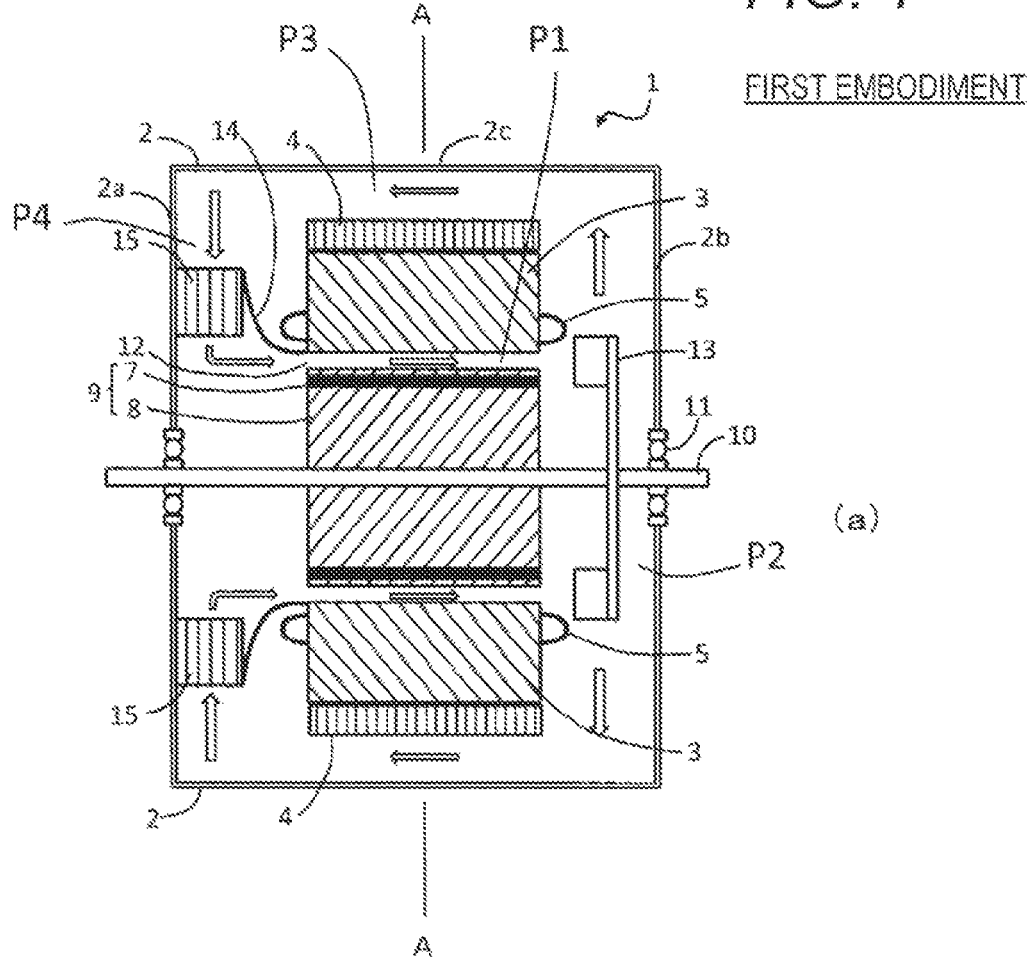
(a)
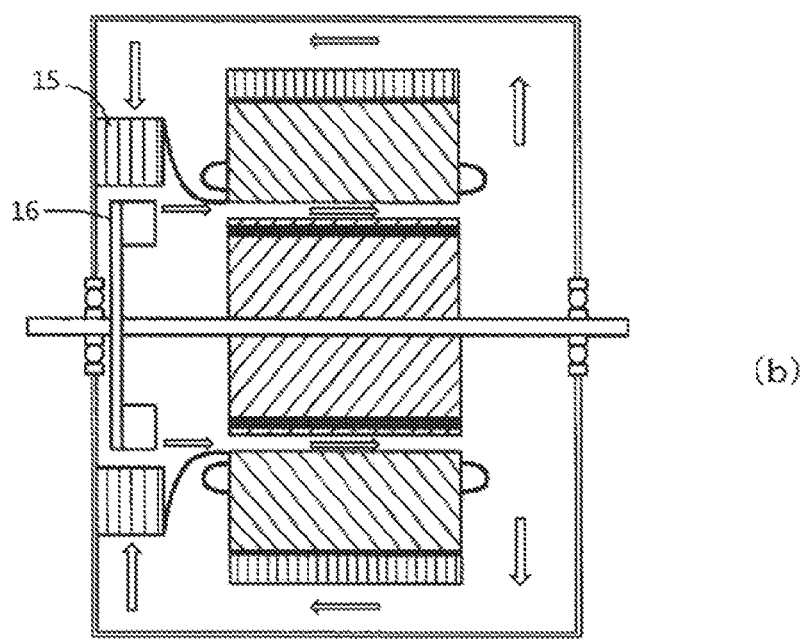
(b)

THIRD EMBODIMENT

FOURTH EMBODIMENT

FIG. 6
FIFTH EMBODIMENT
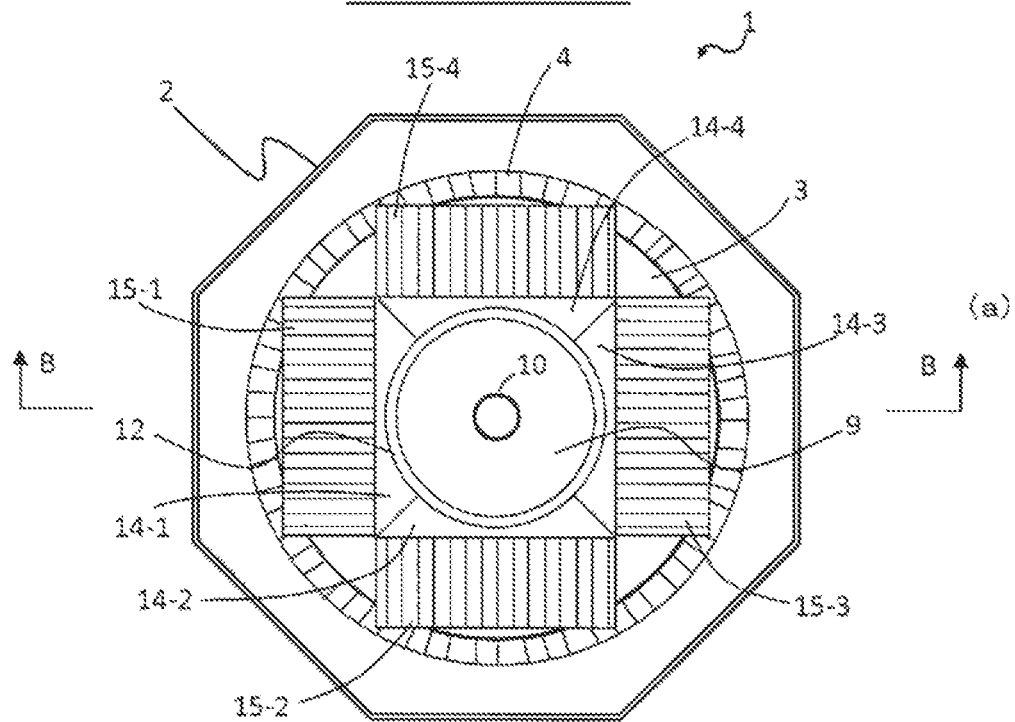
(a)
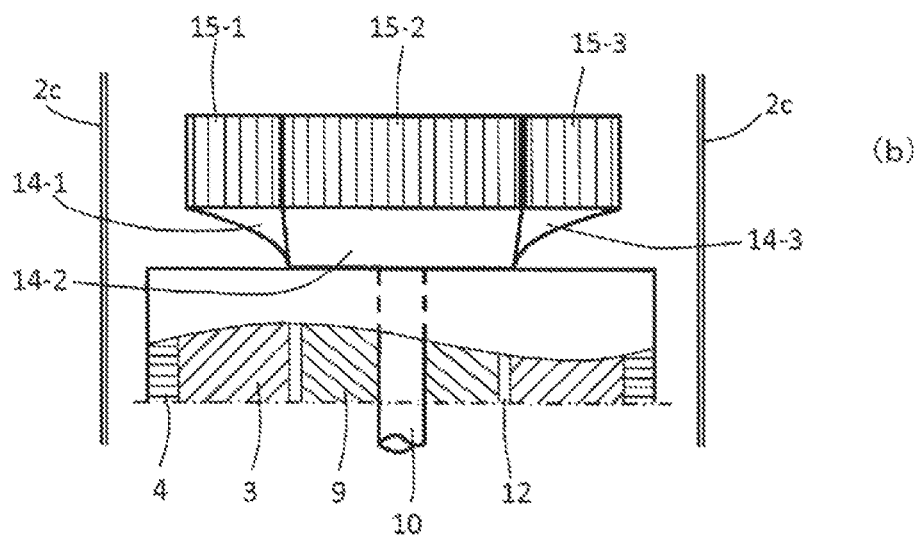
(b)

FIG. 7
SIXTH EMBODIMENT
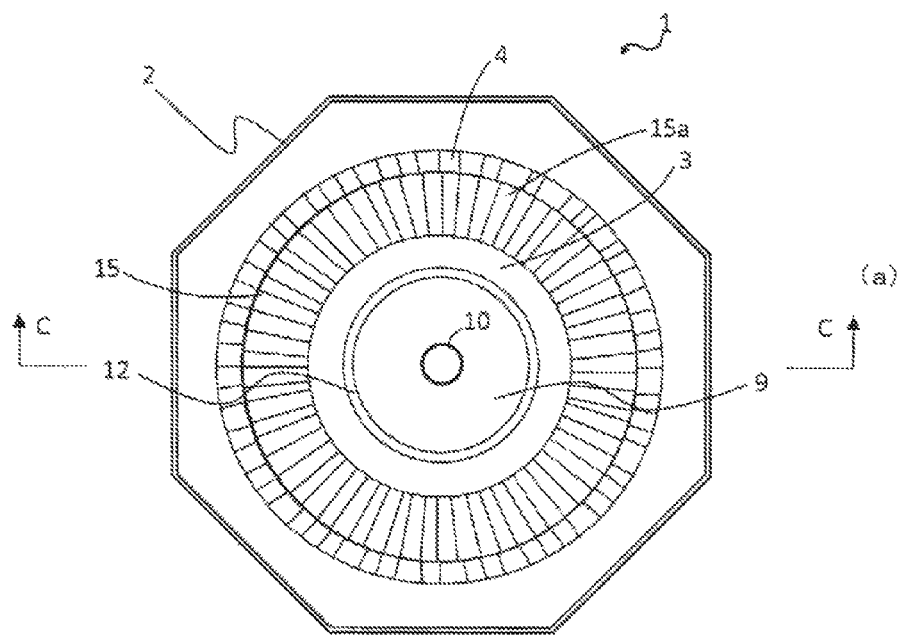
(a)
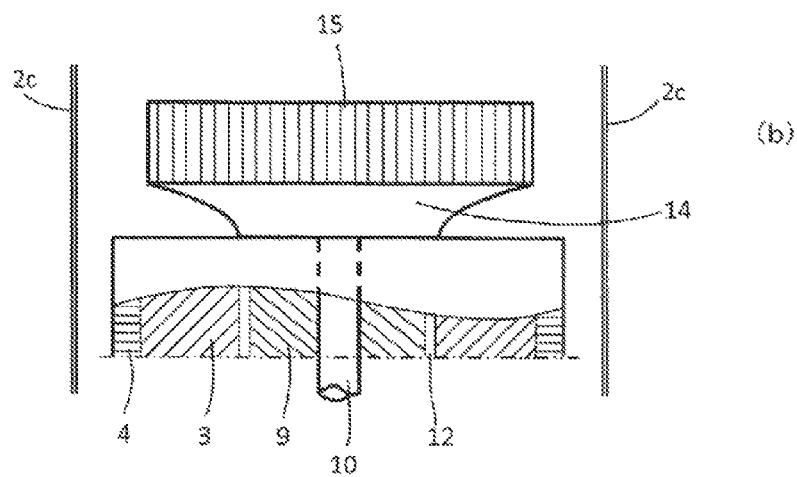
(b)

SEVENTH EMBODIMENT

FIG. 9
EIGHTH EMBODIMENT
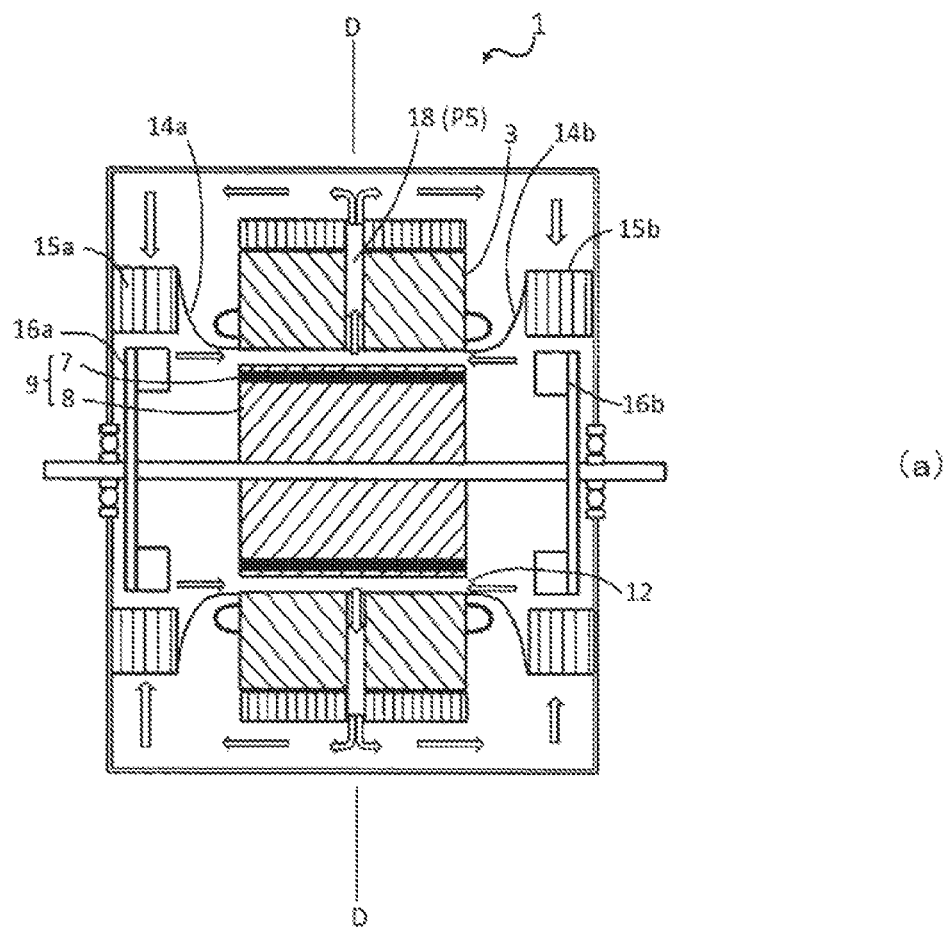
(a)
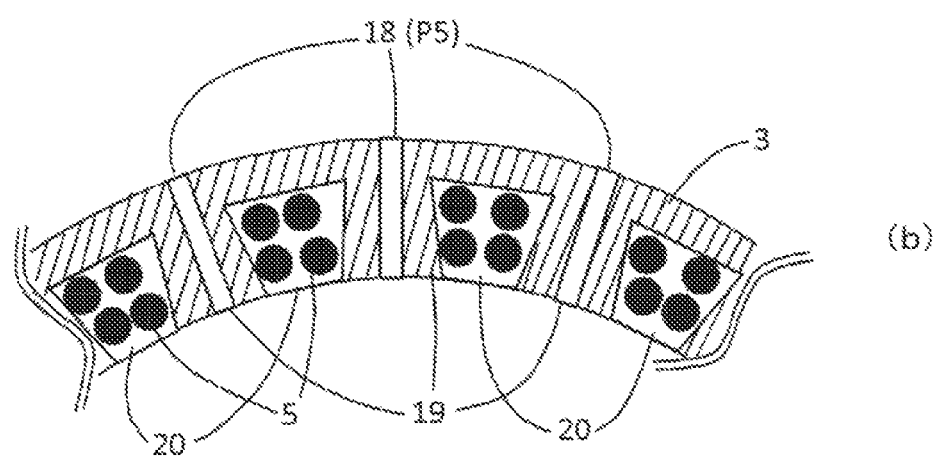
(b)

NINTH EMBODIMENT

FIG. 13
TENTH EMBODIMENT
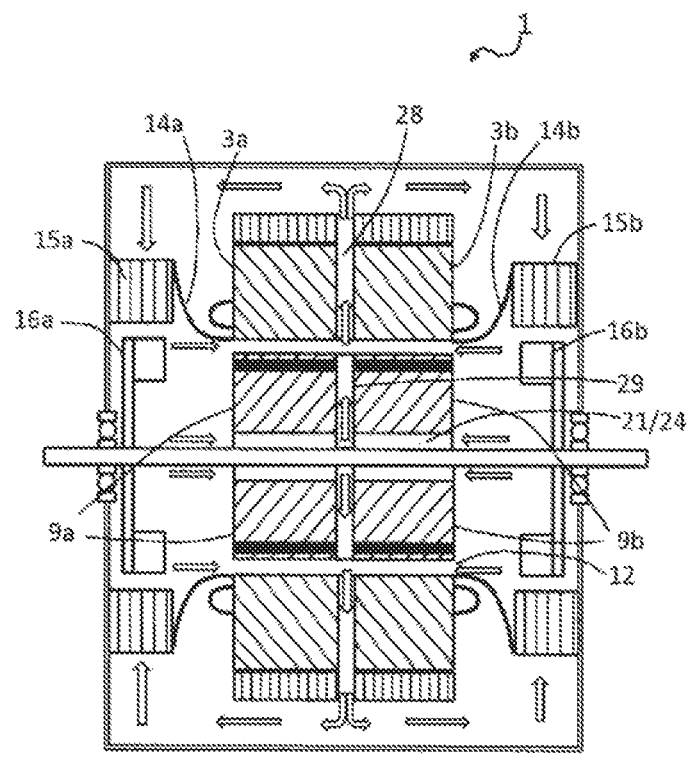
(a)
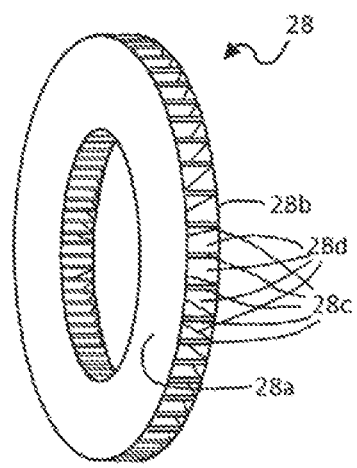
(b)
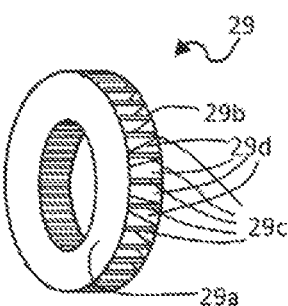
(c)

ELEVENTH EMBODIMENT

FIG. 15
TWELFTH EMBODIMENT
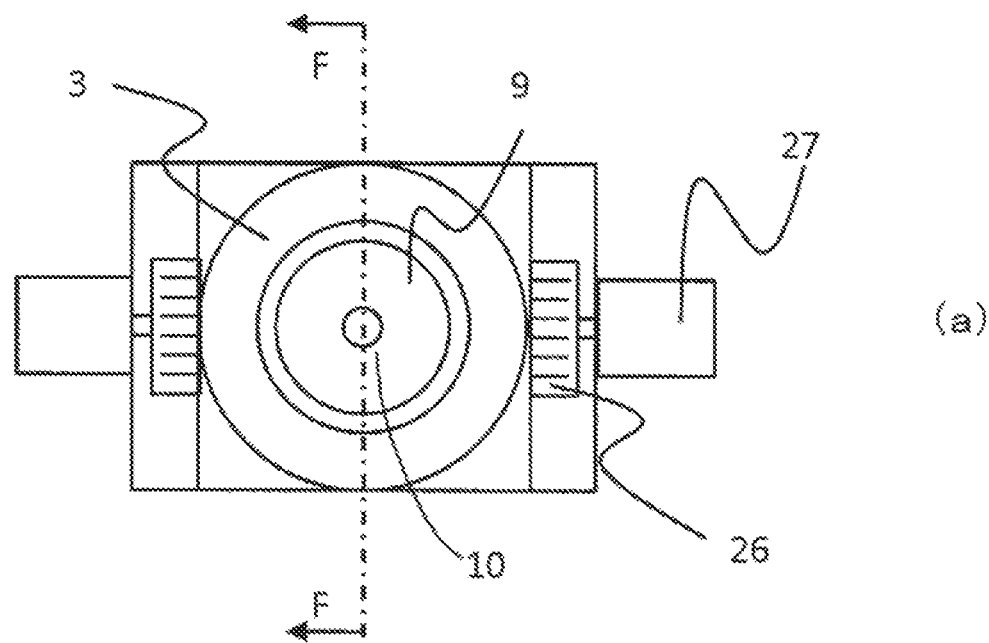
(a)
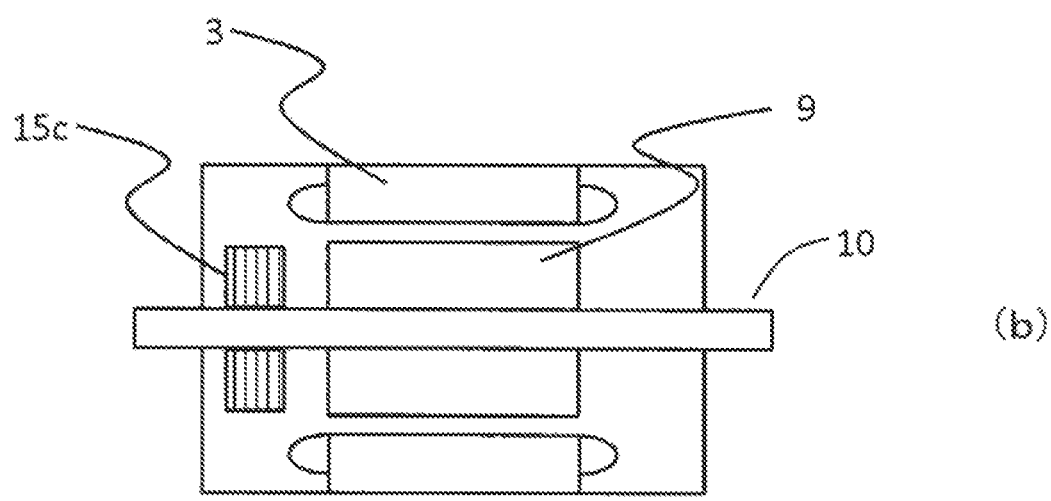
(b)

ROTARY ELECTRIC MACHINE

TECHNICAL FIELD

The present invention relates to a rotary electric machine that includes a heat exchanger for cooling a rotor.

BACKGROUND ART

In recent years, rotary electric machines have been designed for higher output, which has been demanding an increase of power density. The increase of power density, however, has been leading to an increase in heat density, making elevated temperatures of coils and permanent magnets a problem. Since permanent magnets, in particular, may suffer demagnetization at high temperatures, it is desirable to increase cooling efficiency.

PTL 1 discloses an arrangement that provides a path of a cooling medium at the outer periphery of a stator core of a rotary electric machine. A cooling medium, which changes from the liquid phase to the gas phase, is allowed to flow in the path, so that the cooling medium absorbs heat generated at the stator coils.

PTL 2 discloses a rotary electric machine having a rotor cooling arrangement as described below. A hole is provided in a rotor shaft. An inside air fan, which allows the inside air to pass through the air hole and through a gap between a stator and a rotor, and an outside air fan, which allows the outside air through, are provided. In addition, a heat exchanger for performing heat exchanging between the inside air and the outside air is provided at the outside of the stator.

CITATION LIST

Patent Literatures

PTL 1: Japanese Patent Application Laid-Open No. 2009-38864
PTL 2: Japanese Patent Application Laid-Open No. 2007-97325

SUMMARY OF INVENTION

Technical Problem

In the rotor cooling arrangements for the conventional rotary electric machines as described above, a heat exchanger is provided at the outside of the stator. In the case where the inside air is allowed through the gap between the rotor and the stator to cool the rotor, heat exchanging is performed between the inside air and a coil end before the inside air flows into the gap, so that the resultant warmed inside air flows into the gap. Because of this, the rotor cannot be cooled efficiently.

Solution to Problem

According to a first aspect of the present invention, a rotary electric machine includes: a stator including a stator core and stator coils; a rotor provided rotatably with a gap to the stator; a housing that stores the stator and the rotor; a fan that circulates air inside the housing through the gap in the housing; a heat exchanger that cools the air circulated by the fan; and an air guiding plate including an air guiding route formed therein for guiding the air cooled by the heat exchanger such that the cooled air flows into the gap without coming into contact with the stator coils.

According to a second aspect of the present invention, in the rotary electric machine according to the first aspect, it is preferable that the housing includes a tubular body, and a front bracket and a rear bracket that each cover an end of the body and support an end of the rotating shaft, and the heat exchanger is attached so as to be in contact with the front bracket or the rear bracket and is cooled by outside air through the front bracket or the rear bracket in contact with the heat exchanger.

According to a third aspect of the present invention, in the rotary electric machine according to the second aspect, it is preferable that the air guiding plate is placed at a cooled-air inlet of the gap such that an end portion of the stator coils is outside the air guiding route.

According to a fourth aspect of the present invention, in the rotary electric machine according to the third aspect, it is preferable that the air guiding plate is placed between a cooled-air outlet of the heat exchanger and an end surface of the stator core such that the end portion of the stator coils is outside the air guiding route.

According to a fifth aspect of the present invention, in the rotary electric machine according to the fourth aspect, it is preferable that the rotor is placed inside the stator, and the heat exchanger is an annular body, and this annular heat exchanger is placed on the front bracket or the rear bracket concentrically with a rotating axis of the rotor, and the cooled-air outlet has an opening in an end surface, facing the stator, of the annular heat exchanger, and the air guiding plate is formed in a funnel shape such that the cooled air flowing from the cooled-air outlet is guided by the air guiding route in a direction along the rotating axis to flow into the gap.

According to a sixth aspect of the present invention, it is preferable that the rotary electric machine according to any one of the first to fifth aspects further includes a rotating shaft connected to the rotor, wherein the fan is mounted on the rotating shaft.

According to a seventh aspect of the present invention, in the rotary electric machine according to the sixth aspect, it is preferable that the fan is a forced draft fan or a centrifugal fan, either of which is mounted on one end of the rotating shaft.

According to an eighth aspect of the present invention, in the rotary electric machine according to the sixth aspect, it is preferable that the fan includes a first fan placed at one end of the rotating shaft and a second fan placed at another end of the rotating shaft, and one of the first and second sending fans is a forced draft fan, and another is a centrifugal fan.

According to a ninth aspect of the present invention, in the rotary electric machine according to the first aspect, it is preferable that the heat exchanger includes first and second heat exchangers each provided at an end of the rotating shaft.

According to a tenth aspect of the present invention, in the rotary electric machine according to the ninth aspect, it is preferable that the stator includes a plurality of stator radial ducts that extends from an axially middle portion of the gap in a radial direction through to a peripheral surface, and the fan includes first and second forced draft fans each provided at an end of the rotating shaft.

According to an eleventh aspect of the present invention, in the rotary electric machine according to the tenth aspect, it is preferable that the rotor includes a plurality of rotor radial ducts formed from the axially middle portion of the gap toward an inner diameter direction and a rotor axial duct that extends from both end surfaces of the rotor in a rotating shaft direction and is in communication with the rotor radial ducts.

According to a twelfth aspect of the present invention, in the rotary electric machine according to the ninth aspect, it is preferable that the stator includes a plurality of stator split cores, the rotor includes a plurality of rotor split cores, a stator radial duct structure is provided between two consecutive stator split cores of the plurality of stator split cores, the stator radial duct structure including a plurality of duct spaces that penetrates the stator from an axially middle portion of the gap in a radial direction, a rotor radial duct structure is provided between two consecutive rotor split cores of the plurality of rotor split cores, the rotor radial duct structure including a plurality of duct spaces that penetrates the rotor from an axially middle portion of the rotor axial duct in the radial direction, and the fan includes first and second forced draft fans each provided at an end of the rotating shaft.

According to a thirteenth aspect of the present invention, in the rotary electric machine according to any one of the first to fifth aspects, it is preferable that the fan is provided at an outer periphery side of the stator, and is driven to rotate from an outside of the rotary electric machine.

According to a fourteenth aspect of the present invention, in the rotary electric machine according to the first aspect, it is preferable that the heat exchanger performs heat exchanging between a cooling medium supplied from an outside of the rotary electric machine and the cooled air.

According to a fifteenth aspect of the present invention, in the rotary electric machine according to the fourteenth aspect, it is preferable that the housing includes a tubular body, and a front bracket and a rear bracket that each cover an end of the body, and the heat exchanger is not in contact with the front bracket or the rear bracket and is provided in proximity to the rotor.

Advantageous Effects of Invention

The rotary electric machine according to the present invention can cool the rotor efficiently. In particular, a permanent-magnet type rotary electric machine can achieve a high power density since the permanent magnets of the rotor are cooled efficiently.

BRIEF DESCRIPTION OF DRAWINGS

FIGS. 1(a) and 1(b) are schematic views of a rotary electric machine according to a first embodiment of the present invention. FIG. 1(a) is a diagram of an arrangement with a rotor interposed between a heat exchanger for cooling the rotor and a fan provided at the opposite side. FIG. 1(b) is a diagram of a modification of the first embodiment, in which the fan is provided at the side of the rotor-cooling heat exchanger.

FIGS. 6(a) and 6(b) are schematic views of a rotary electric machine according to a fifth embodiment of the present invention. FIG. 6(a) is a diagram of an arrangement of a heat exchanger observed from an axial direction of the rotary electric machine. FIG. 6(b) is a sectional view along line B-B of FIG. 6(a).

FIGS. 7(a) and 7(b) are schematic views of a rotary electric machine according to a sixth embodiment of the present invention. FIG. 7(a) is a diagram of an arrangement of an annular-ring like heat exchanger observed from an axial direction of the rotary electric machine. FIG. 7(b) is a sectional view along line C-C of FIG. 7(a).

FIGS. 9(a) and 9(b) are schematic views of a rotary electric machine according to an eighth embodiment of the present invention. FIG. 9(b) is a schematic sectional view taken along a plane perpendicular to an axial direction at line D-D of a rotary electric machine 1 illustrated in FIG. 9(a), and it is a schematic diagram of an arrangement of radial ducts 18 provided in a stator.

FIG. 10(b) is a schematic sectional view taken along a plane perpendicular to an axial direction at line E-E of an rotary electric machine 1 illustrated in FIG. 10(a), and it is a schematic diagram of an arrangement of rotor radial ducts 22 provided in a rotor.

FIG. 11(a) is an external view of the rotor 9 observed from a direction orthogonal to an axial direction. FIG. 11(b) is an external view of the rotor 9 observed from the axial direction.

FIGS. 13(a), 13(b), and 13(c) are schematic views of a rotary electric machine according to a tenth embodiment of the present invention. FIG. 13(a) is a sectional view, along an axial direction, of an arrangement according to the tenth embodiment, which includes two segmented stator cores and two segmented rotor cores. FIG. 13(b) is an external view of a stator radial duct structure provided between the two stator cores 3a and 3b. FIG. 13(c) is an external view of a rotor radial duct structure provided between the two rotor cores 9a and 9b.

FIGS. 15(a) and 15(b) are schematic views of a rotary electric machine according to a twelfth embodiment of the present invention. FIG. 15(b) is a sectional view of a rotary electric machine illustrated in FIG. 15(a) along a plane perpendicular to an axial direction at line F-F.

DESCRIPTION OF EMBODIMENTS

Figure 2:
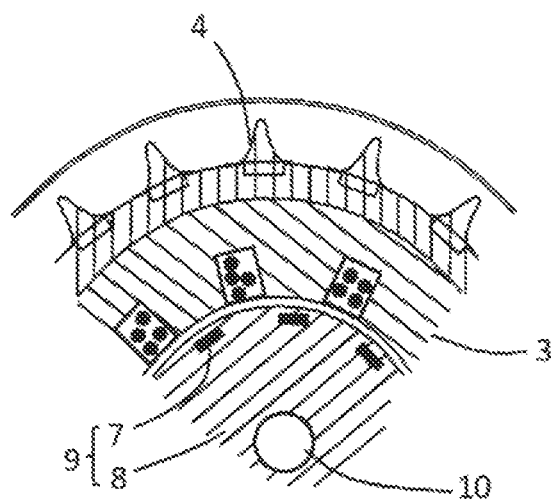
FIG. 2 is a schematic view of a partial section taken from FIG. 1 along a plane perpendicular to an axial direction at line A-A of the rotary electric machine.

The present invention will now be described in detail with reference to FIGS. 1(a) to 14(b). Like components are indicated with like reference numerals in the figures.

First Embodiment

FIG. 1(a) is a schematic sectional view in a rotary electric machine axial direction of a permanent-magnet type rotary electric machine 1 according to a first embodiment of the present invention. A housing 2 includes, in its inside, a stator 3 and a rotor 9. The housing 2 also includes, in its inside, a fan 13 and heat exchangers 4 and 15 for cooling the stator and the rotor. This arrangement is suitable for permanent-magnet type rotary electric machines of several hundred kW to several tens of MW.

The housing 2 is formed with a cylinder-shaped body 2c, and a front bracket 2a and a rear bracket 2b that cover the ends of the cylindrical body 2c in an axial direction. The brackets 2a and 2b can be removed from the cylindrical body 2c.

The stator 3 is, for example, a distributed winding stator formed with windings of coils 5 in the distributed winding configuration. The number of slots may be any combination of numbers, and the coils 5 may be in a short-pitch winding, a full-pitch winding, or a concentrated winding configuration. The heat exchanger 4 for cooling the stator is provided on an outer peripheral surface of the stator 3. The heat exchanger 4, which is air-cooled, is cooled by air circulated by the fan 13. For example, as illustrated in FIG. 2, which is a sectional view taken from FIG. 1(a) along plane A-A perpendicular to the axial direction, an arrangement may be employed in which fins are placed in a protruding condition on the outer peripheral surface of the stator core so that the fins are cooled by the air circulated inside the rotary electric machine.

The rotor 9 is positioned rotatably inside the stator 3 with a gap 12 therebetween. The rotor 9 includes a rotor core 8 and permanent magnets 7 embedded in the outer side of the rotor core 8. A rotating shaft 10 is provided such that the shaft protrudes from the rotor core 8 on its both ends. The ends of the rotating shaft 10 are each supported by a bearing, now shown, provided at the front bracket 2a and the rear bracket 2b.

The centrifugal fan 13, which rotates together with the rotating shaft 10, is positioned at one end of the rotating shaft 10. The fan 13 circulates a cooling medium, which is air in this embodiment, in the housing 2. The arrows in FIGS. 1(a) and 1(b) depict the flow of the cooling medium. That is, the cooling medium is circulated along circulating paths that include a first circulating path P1 in the gap 12 between the stator 3 and the rotor 9, a second circulating path P2 between an end of the stator coils and the rear bracket 2b, a third circulating path P3 between a peripheral surface of the stator-cooling heat exchanger 4 and the cylindrical body 2c, and a fourth circulating path P4 between an end of the stator coils and the front bracket 2a. In FIG. 1(a), the heat exchanger 15 is positioned in the circulating path P4 formed between the front bracket 2a and the stator 3.

The heat exchanger 15 has an annular external shape, and is attached to the front bracket 2a concentrically with the rotating shaft 10. The heat exchanger 15 is, for example, air-cooled, and is cooled by air through the front bracket 2a. As described hereinafter, the heat exchanger 15 is generally shaped into a rectangular tube (see FIGS. 6(a) and 6(b)) or an annular ring (see FIGS. 7(a) and 7(b)).

An air guiding plate 14 is provided between the heat exchanger 15 and an end surface of the stator core. The air guiding plate 14 guides the air cooled by the heat exchanger 15 such that the cooled air flows into the gap 12 without coming into contact with the end of the stator coils. In other words, the air guiding plate 14 is formed into a funnel shape so as to guide the cooled air flowing out from a cooled-air outlet of the heat exchanger 15 in a direction along the rotating axis. The air guiding plate 14 constitutes an air guiding route to guide the cooled air from the circulating path P4 to the circulating path P1. Thus, the end portion of the stator coils is located outside the air guiding plate 14, which is the air guiding route.

The air guiding plate 14 is preferably in contact with the stator 3 through a packing having good heat-insulating and vibration-control properties and made with synthetic rubber, silicone rubber, plastic, or the like.

The air guiding plate 14 may be formed into various shapes corresponding to the shape of the heat exchanger 15. Some shapes of the air guiding plate, which correspond to the shapes of the heat exchanger, will be described hereinafter.

The cooling medium is cooled through heat exchanging with a heat absorbing portion of the rotor-cooling heat exchanger 15 positioned in the circulating path P4. The heat absorbing portion is, for example, a coolant or a fin. The stator 3 is cooled from the outer periphery by the heat exchanger 4 provided in contact with the outer periphery of the stator core.

The heat exchanger 15 and the air guiding plate 14 as described above work such that the cooling medium flowing from the circulating path P3 to the path P4 due to the rotation of the centrifugal fan 13 is guided in full from an outer peripheral surface to an inner peripheral surface of the annular body of the heat exchanger 15, and then the cooling medium, which has been cooled, is guided in full into the gap 12.

As described above, the cooling medium, which has been cooled, flows from the front bracket 2a side into the gap 12, and then from the rear bracket 2b side passes along an inner surface of the cylinder-shaped body 2c to return to the front bracket 2a side, so that the cooling medium is cooled by the heat exchanger 15 again. That is, the cooling medium flows along the circulating paths from P1 to P2, then to P3 and on to P4. The rotary electric machine illustrated in FIG. 1 is similar to one positioned with the right and left sides reversed. Hence, the fan, the heat exchangers, and the air guiding plate, etc. may be all positioned in a manner with the right and left sides of FIG. 1 reversed, and the route in which the cooling medium flow may correspond to this, so that the cooling medium may be circulated in the reverse direction. In addition, the front bracket 2a and the rear bracket 2b are merely to differentiate between the brackets at either side of the rotating shaft, and thus, they may be positioned in a manner with the right and left sides of FIG. 1 reversed. Similarly, in the embodiments to be described hereinafter, FIGS. 2 to 14 are each similar when the right and left sides thereof are reversed. For convenience of description, the cooling medium flows into the gap 12 from the left side of each drawing, and a bracket at the left side is denoted as a front bracket and a bracket at the right side as a rear bracket.

Here, eddy current loss is caused in the outer periphery of the rotor core 8, in which the permanent magnets 7 are embedded, due to slot ripple, power supply harmonics, and the like. This generates heat to increase temperatures. The permanent magnets 7 have temperature dependency, and the properties of the magnets deteriorate as temperatures are increased. Furthermore, if a magnet operation point exceeds a knick-point, irreversible demagnetization will be caused. Thus, the outer periphery of the rotor core 8 needs sufficient cooling so that the permanent magnets do not exceed the knickpoint.

The coils 5 normally have a higher temperature increase limit than the permanent magnets 7. Hence, the temperature of the permanent magnets 7 determines the upper limit value of the operating temperature of the permanent-magnet type rotary electric machine. In other words, an improvement in cooling performance of the permanent magnets is most important for a smaller size and a higher power density of a permanent-magnet type rotary electric machine. Thus, a consideration for positioning the heat exchanger 15 in the circulating paths is that a heat exchanger, positioned only on the outer periphery side of the stator as provided conventionally, cannot cool the magnets preferentially, since a cooling medium (for example, air) performs heat exchanging with heat releasing portions (for example, a coil end and a stator core) in the ventilation path in addition to the magnets.

The heat exchanger 15, when positioned in proximity to the rotor 9, can preclude the heat exchanging between the cooling medium and heat releasing materials, such as the coil end, to cool the rotor 9 preferentially, and thus can keep the permanent magnets 7, embedded in the rotor 9, at low temperatures. In addition, by proactively designing the heat exchanger 15 so that it is possible to position the heat exchanger in proximity to the rotor, an arrangement allowing efficient cooling of the rotor 9 can be achieved. The preferential cooling of the rotor 9 as described above can reduce an increase in temperature of the magnets, enabling downsizing of a permanent-magnet type rotary electric machine.

In the rotary electric machine according to the first embodiment arranged as described above, the rotation of the rotor 9 prompted by driving signals causes the centrifugal fan 13 to rotate and circulate the air in the housing 2 along the circulating paths from P1 to P2, then to P3 and to P4, and on to P1. The air flowing from the circulating path P3 to P4 flows from the outer peripheral surface of the heat exchanger 15 into its inner peripheral space. In this process, the circulated air is cooled through the heat exchanging by the heat exchanger 15. The air guiding plate 14 is provided in the circulating path P4 to cause the air entering from the circulating path P3 to flow in full into the heat exchanger 15. In other words, the air guiding plate 14 functions as a baffle plate that prevents the air from flowing directly from the circulating path P3 into a cooling-medium inflow entrance of the gap 12. Because of the presence of the air guiding plate 14, the air, which has flown from the circulating path P3 into the circulating path P4 to come into contact with the coil end of the stator 3 and thereby be heated, is prevented from flowing into the gap 12. Since it is only the air cooled by the heat exchanger 15 that flows into the gap 12, the rotor 9 can be cooled efficiently.

Modifications of First Embodiment

The first embodiment may be modified as described hereinafter.

(1) FIG. 1(b) is a diagram of a modification of the first embodiment. A forced draft fan 16, instead of the centrifugal fan 13 illustrated in FIG. 1(a), is provided on the inner periphery side of a heat exchanger 15. A rotary electric machine in FIG. 1(b) can achieve similar air circulation to the rotary electric machine in FIG. 1(a), and can bring about a similar operational advantage.

(2) The stator-cooling heat exchanger 4 can take various forms in a manner dependent on the output of the rotary electric machine 1 and heat released from the stator 3. A fluid-cooled heat exchanger may be used instead of the air-cooled heat exchanger 4 illustrated in FIGS. 1(a) and 2. The fluid-cooled heat exchanger may provide cooling using a fluid cooling medium, which is cooled outside the rotary electric machine 1 and is supplied to the heat exchanger.

(3) In the case in which the output of the rotary electric machine is small and thus the heat released is insignificant, a heat exchanger 4 may be excluded. That is, the heat exchanger 4 is a nonessential component to the rotary electric machines illustrated in FIGS. 1(a) and 1(b).

(4) Although the annular heat exchanger 15 is provided with the rotating shaft 10 at the center in FIGS. 1(a) and 1(b), the rotary electric machine according to the present invention is not limited by the annular heat exchanger 15. In addition, the output of the fan (the flow rate of the cooling medium), the capacity of a heat exchanger, and the numbers of fans and heat exchangers are designed so as to be sufficient to cool the heat generated by the rotor and the stator.

(5) Although the heat exchanger 15 has been described as air-cooled, which is cooled by the air through the front bracket 2a, the heat exchanger 15 may be fluid-cooled with an external cooling medium introduced to provide heat exchanging with the air inside the rotary electric machine. The type of heat exchanger is selected in correspondence with the output of a motor and is designed so as to prevent the performance of the permanent magnets from deteriorating due to heat released from the motor as described hereinafter.

(6) Although the heat exchanger 15 and the air guiding plate 14 are separate pieces as described above, these components may be integrated into one piece.

Second Embodiment

Figure 3:
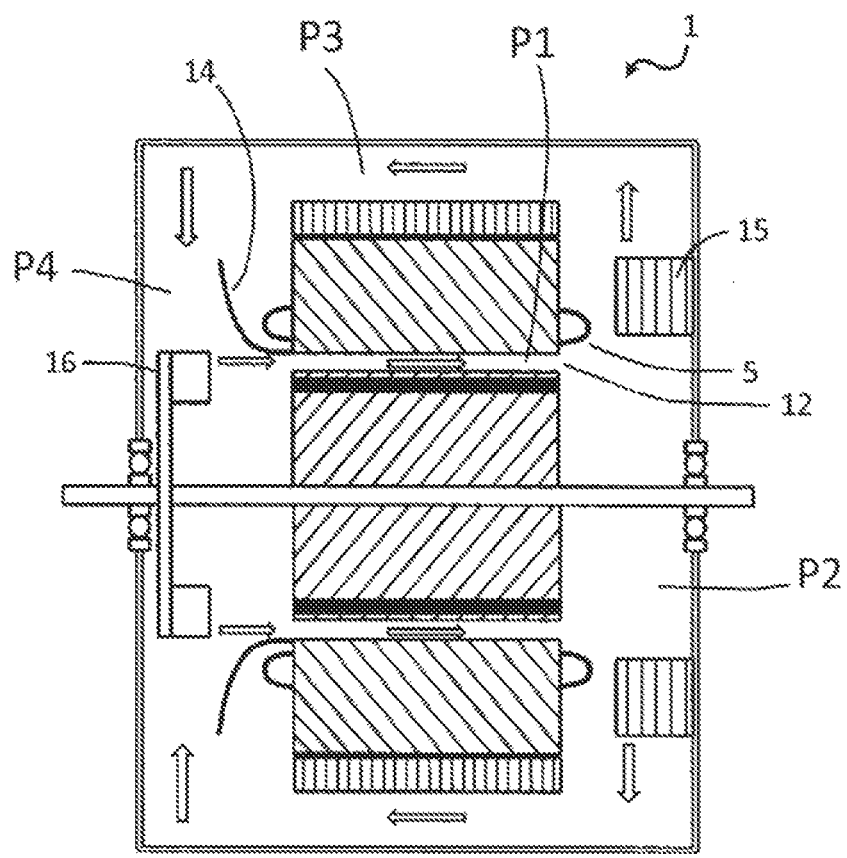
FIG. 3 is a schematic view of a rotary electric machine according to a second embodiment of the present invention.

FIG. 3 is a diagram for describing a rotary electric machine according to a second embodiment.

FIGS. 1(a) and 1(b) describe examples in each of which the heat exchanger 15 is placed at the cooling-medium inlet side of the gap 12, in other words, at the front bracket 2a side. In the rotary electric machine according to the second embodiment, a forced draft fan 16 is provided at the cooling-medium inlet side of a gap, in other words, at a front bracket 2a side, and a heat exchanger 15 is placed at the opposite side, in other words, at a rear bracket 2b side, as illustrated in FIG. 3. In the second embodiment, a funnel-like air guiding plate 14 is provided on an end surface of a stator core, as illustrated, to prevent a cooling medium, which has been warmed by coils 5, from flowing directly from the cooling-medium inlet side into the gap 12.

In the rotary electric machine according to the second embodiment arranged as described above, the rotation of a rotor 9 prompted by driving signals causes a forced draft fan 16 to rotate and circulate the air in the housing 2 along the circulating paths from P1 to P2, then to P3 and to P4, and on to P1. The air flowing from the circulating path P1 to P2 flows from the inner periphery side of the heat exchanger 15 to its outer periphery side. In this process, the air is cooled through the exchanging by the heat exchanger 15. The cooled air flows from the circulating path P2 to the circulating paths P3 and P4. The air, which has flown into the circulating path P4, flows along a funnel-like air guiding route inside the air guiding plate 14 and enters the circulating path P1, which is the gap 12, to cool the rotor 9 efficiently.

Because of the presence of the air guiding plate 14 in the circulating path P4, the air, which has flown from the circulating path P3 into the circulating path P4 to come into contact with a coil end of the stator 3 and thereby be heated, is restrained from flowing directly into the gap 12.

Third Embodiment

Figure 4:
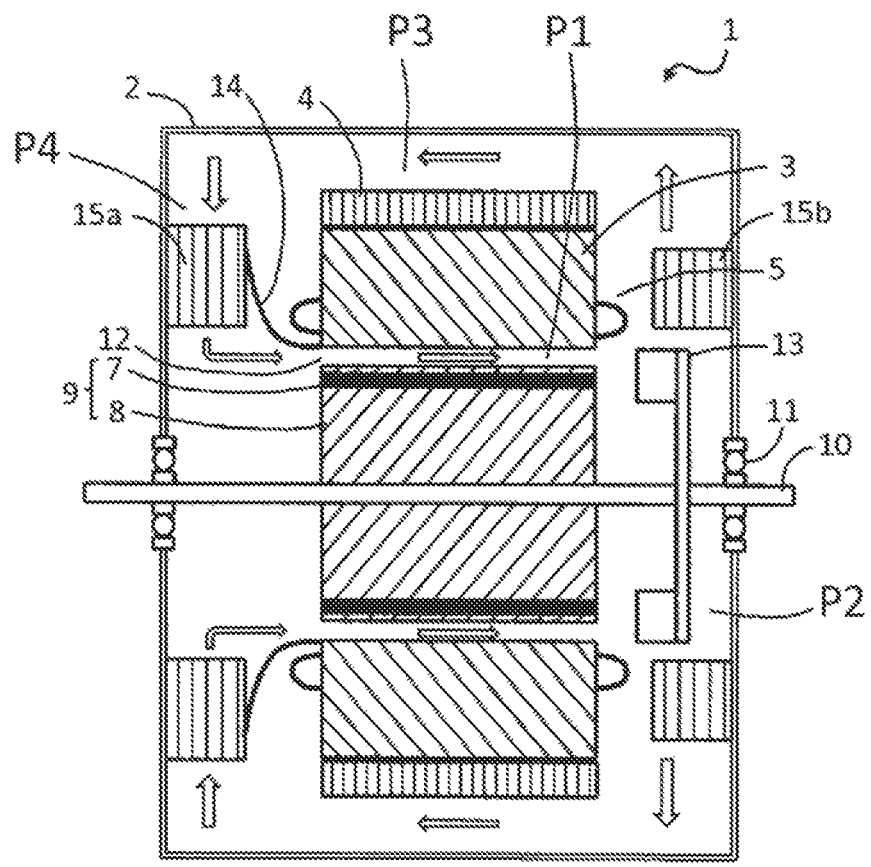
FIG. 4 is a schematic view of a rotary electric machine according to a third embodiment of the present invention.

FIG. 4 is a diagram for describing a rotary electric machine according to a third embodiment.

The rotary electric machine according to the third embodiment includes an additional annular heat exchanger positioned at the cooling-medium outlet side of a gap 12 in comparison to the rotary electric machine illustrated in FIG. 1(a). In other words, the rotary electric machine according to the third embodiment includes a heat exchanger 15a and a heat exchanger 15b provided at a cooling-medium inlet and an outlet of the gap 12, respectively. The heat exchangers 15a and 15b may be different in size, in other words, in heat exchanging performance from right to left.

In the rotary electric machine according to the third embodiment arranged as described above, the rotation of a rotor 9 prompted by driving signals causes a fan 13 to rotate and circulate the air in a housing 2 along circulating paths from P1 to P2, then to P3 and to P4, and on to P1. The air flowing from the circulating path P1 to P2 flows from the inner periphery side of the heat exchanger 15b to its outer periphery side. In this process, the air is cooled through the heat exchanging by the heat exchanger 15b. The cooled air flows from the circulating path P2 to the circulating paths P3 and P4. The air flowing into the circulating path P4 flows from an outer peripheral surface of the heat exchanger 15 into its inner peripheral space. In this process, the circulated air is cooled through the heat exchanging by the heat exchanger 15. An air guiding plate 14 is provided in the circulating path P4 to cause the air entering from the circulating path P3 to flow in full into the heat exchanger 15. In other words, the air guiding plate 14 functions as a baffle plate that prevents the air from flowing directly from the circulating path P3 into the cooling-medium inflow entrance of the gap 12. Because of the presence of the air guiding plate 14, the air, which has flown from the circulating path P3 into the circulating path P4 to come into contact with a coil end of a stator 3 and thereby be heated, is prevented from flowing into the gap 12. As a result, the rotor 9 is cooled efficiently.

Because of the presence of the air guiding plate 14 in the circulating path P4, the air, which has flown from the circulating path P3 into the circulating path P4 to come into contact with the coil end of the stator 3 and thereby be heated, is restrained from flowing directly into the gap 12. In addition, since the heat exchanger 15a and the heat exchanger 15b are provided, the circulated air in the housing 2 can be cooled further.

Fourth Embodiment

Figure 5:
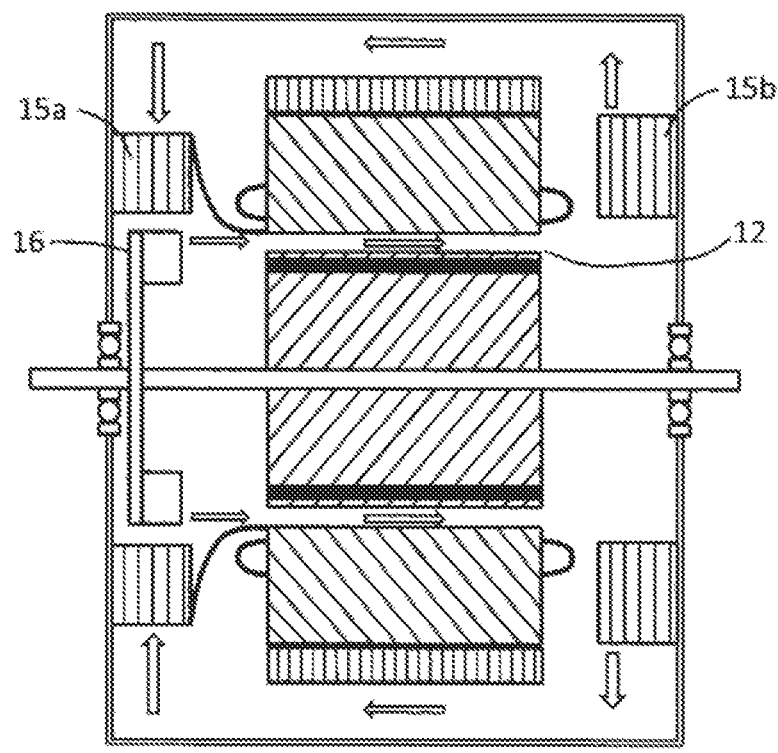
FIG. 5 is a schematic view of a rotary electric machine according to a fourth embodiment of the present invention.

FIG. 5 is a diagram for describing a rotary electric machine according to a fourth embodiment.

The rotary electric machine according to the fourth embodiment includes an additional annular heat exchanger positioned at the cooling-medium outlet side of a gap 12 in comparison to the rotary electric machine illustrated in FIG. 1(b). In other words, the rotary electric machine according to the fourth embodiment includes a heat exchanger 15a and a heat exchanger 15b provided at a cooling-medium inlet and an outlet of the gap 12, respectively. The heat exchangers 15a and 15b may be different in size, in other words, in heat exchanging performance from right to left.

The mechanisms of circulating the cooled air and cooling a rotor 9 in the rotary electric machine according to the fourth embodiment arranged as described above are similar to those in the third embodiment and thus their description will be omitted.

Fifth Embodiment

The heat exchangers 15, 15a, and 15b for cooling the cooling medium flowing into the gap 12 have been described as annular heat exchangers with the rotating shaft 10 as the central axis. Specific exemplary rotor-cooling heat exchangers 15, 15a, and 15b each formed into an annular shape will now be described as fifth and sixth embodiments.

FIGS. 6(a) and 6(b) are diagrams of a rotary electric machine according to the fifth embodiment. FIG. 6(a) is a diagram of an arrangement of the heat exchanger 15 observed from an axial direction of the rotary electric machine. FIG. 6(b) is a sectional view along line B-B of FIG. 6(a). To facilitate understanding of positional relationship among components inside a housing, a front bracket 2a or a rear bracket 2b is removed and the heat exchanger is illustrated in a plan view.

In FIG. 6(a), the housing 2 is illustrated as a tube-like shape with an octagonal section. The section may be of a round shape or a polygon. In the fifth embodiment, segmented heat exchangers 15-1 to 15-4, which are rectangular in a plan view, are positioned with a rotating shaft 10 at the center as illustrated in FIG. 6(a). Segmented air guiding plates 14-1 to 14-4 are connected, at one end each, to the segmented heat exchangers 15-1 to 15-4, respectively. The segmented air guiding plates 14-1 to 14-4 are, at another end each, in contact with an end surface of a stator core in proximity to a gap 12.

In FIG. 6(b), the segmented heat exchangers 15-1 to 15-3 and the segmented air guiding plates 14-1 to 14-3 are illustrated. The one end of each of the segmented air guiding plates 14-1 to 14-4 is linear and connected to an inner periphery edge of each of the segmented heat exchangers 15-1 to 15-4. The other end of each of the segmented air guiding plates 14-1 to 14-4, where, in other words, the plates are in contact with the end surface of the stator core, is shaped into an arc. In addition, neighboring sides of the segmented air guiding plate 14-1 to 14-4 are in close contact with each other, so that the air, which is introduced to the inside of the segmented heat exchangers 15-1 to 15-4 and cooled, flows in full without leak into the cooling-medium inlet side of the gap 12.

The air guiding plate 14 is of a funnel shape having a rectangular section. While the segmented air guiding plates 14-1 to 14-4 may be secured to the segmented heat exchangers 15-1 to 15-4 or to the end surface of the stator core, assembly is easier with the segmented air guiding plates secured to the segmented heat exchangers 15-1 to 15-4. The segmented air guiding plates 14-1 to 14-4 are preferably in contact with the stator 3 through a packing having good heat-insulating and vibration-control properties and made with synthetic rubber, silicone rubber, plastic, or the like.

In the fifth embodiment, four segmented heat exchangers 15-1 to 15-4 are used to form the rectangular-tube like heat exchanger 15. A large number of segmented heat exchangers, however, may be used to form the heat exchanger.

Sixth Embodiment

FIGS. 7(a) and 7(b) are diagrams of a rotary electric machine according to a sixth embodiment. The rotary electric machine according to the sixth embodiment includes an annular-ring like heat exchanger 15. FIG. 7(a) is a diagram of an arrangement of the annular-ring like heat exchanger 15 observed from an axial direction of the rotary electric machine. FIG. 7(b) is a sectional view along line C-C of FIG. 7(a). In the case with the annular-ring shaped heat exchanger as illustrated in FIGS. 7(a) and 7(b), fins provided on an outer peripheral surface of the heat exchanger are arranged radially with respect to a rotating shaft 10. An air guiding plate 14 is of a funnel shape having a circular section. The air guiding plate 14 is connected at a larger diameter end to the heat exchanger 15 at a circular-shaped air discharge opening. A smaller diameter end of the air guiding plate 14 encloses a cooled-air inlet of a gap 12 on an end surface of the stator. The heat exchanger 15 is a flat annular body with one end surface in contact with a front bracket 2a, so that heat is dissipated through the front bracket 2a. The circular-shaped air discharge opening is at the other end surface of the annular heat exchanger 15.

Seventh Embodiment

Figure 8:
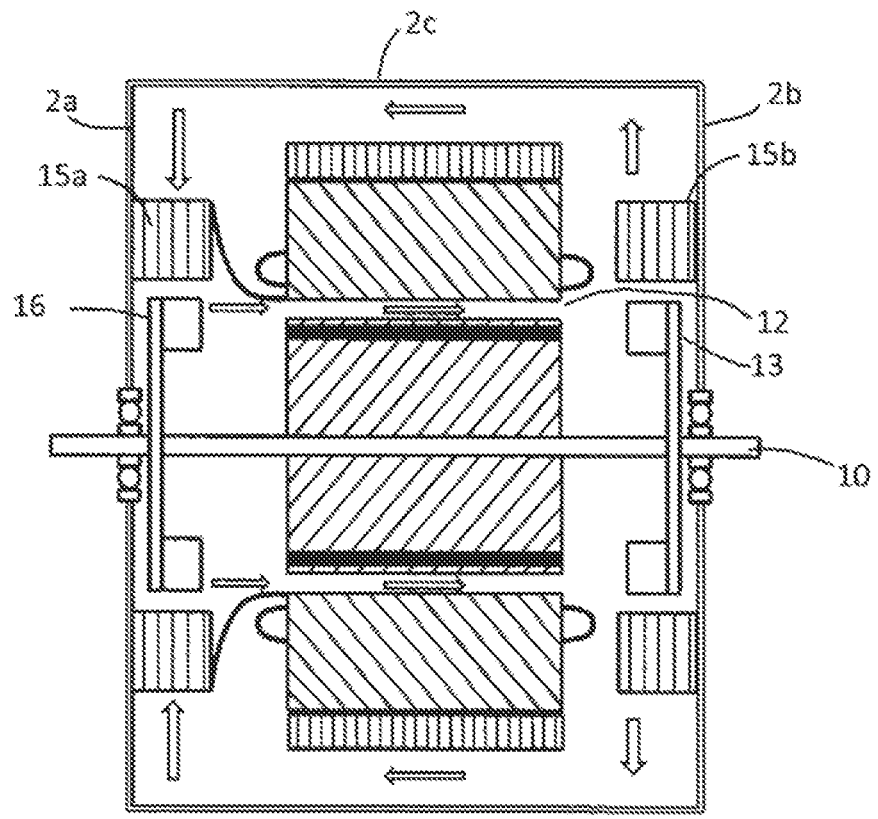
FIG. 8 is a schematic view of a rotary electric machine according to a seventh embodiment of the present invention.
Figure 10:
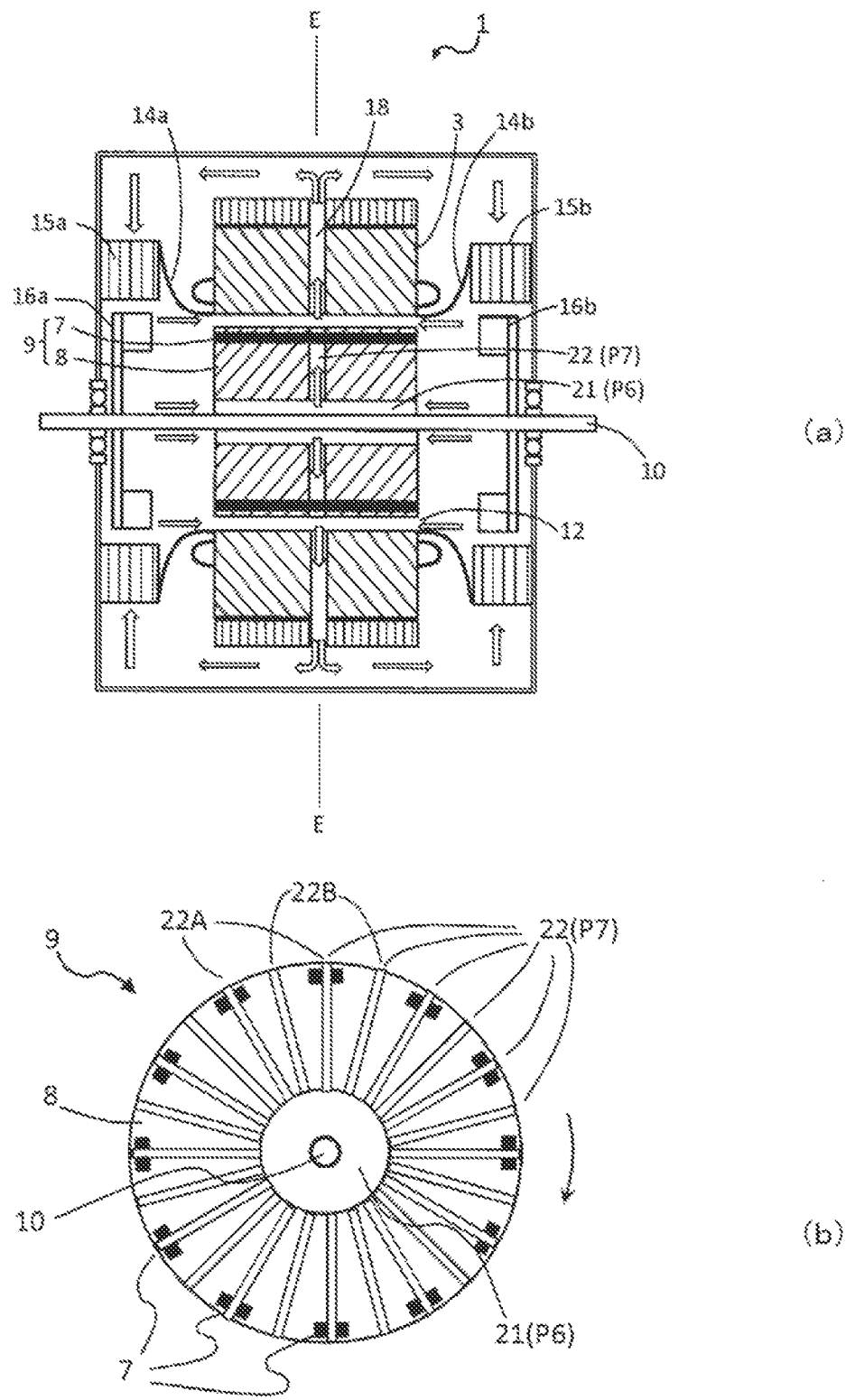
FIGS. 10(a) and 10(b) are schematic views of a rotary electric machine according to a ninth embodiment of the present invention.
Figure 11:
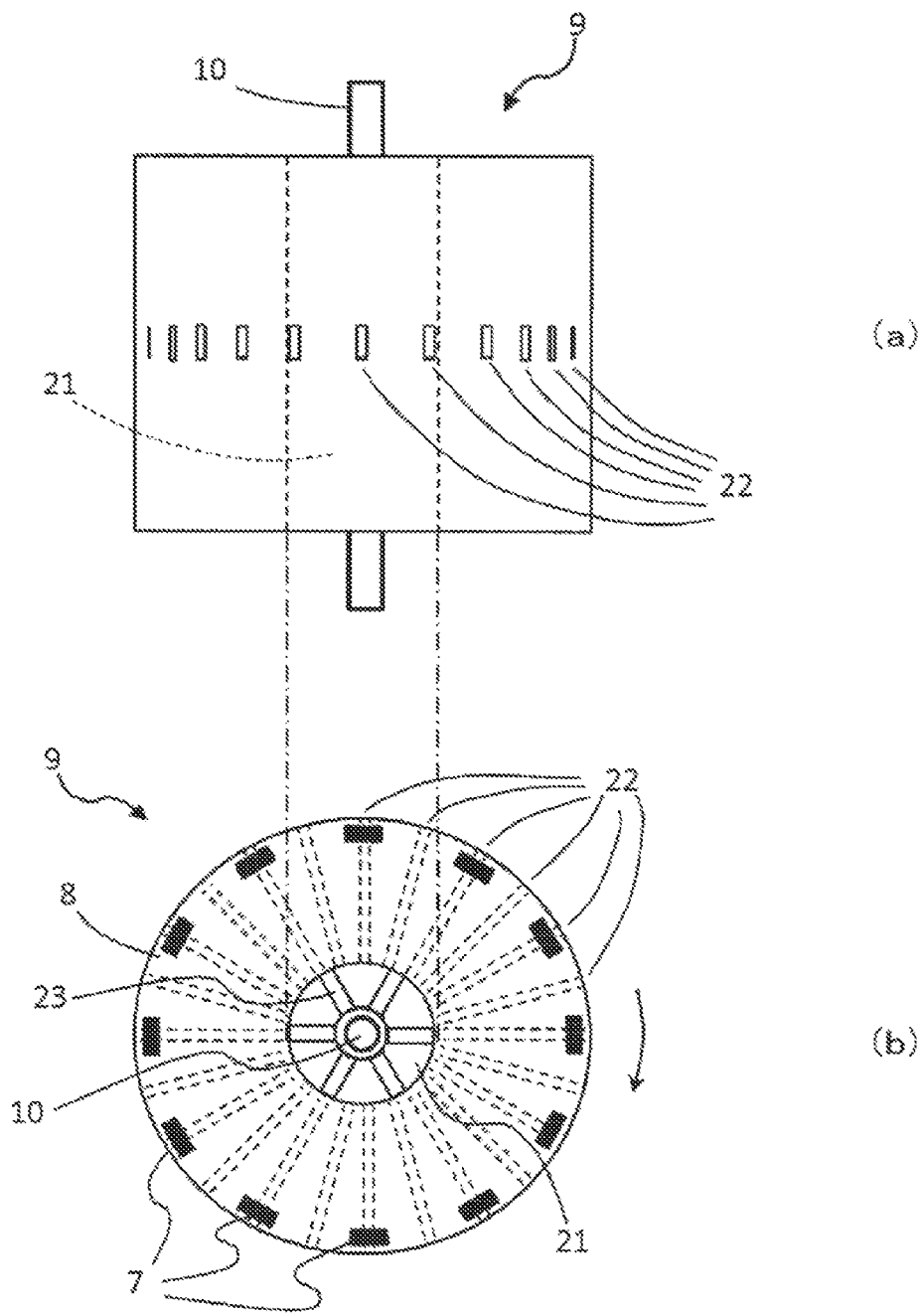
FIGS. 11(a) and 11(b) are diagrams for describing an arrangement of an axial duct 21 and the rotor radial ducts 22 illustrated in FIGS. 10(a) and 10(b).

FIG. 8 is a diagram of a rotary electric machine according to a seventh embodiment.

The rotary electric machine illustrated in FIG. 8 includes heat exchangers 15a and 15b at a front bracket 2a and a rear bracket 2b, respectively, and fans 13 and 16 at both ends of a rotating shaft 10. The forced draft fan 16 is positioned at the inner periphery side of the heat exchanger 15a, and the centrifugal fan 13 is positioned at the inner periphery side of the heat exchanger 15b. The heat exchangers 15a and 15b may have an identical capacity or different capacities.

The forced draft fan 16 forces the cooled air into a cooled-air inlet of a gap 12 and the centrifugal fan 13 sucks the cooled air out from a cooled-air outlet of the gap 12, so that the air is circulated in a housing 2. This can provide a higher air flow rate than the case in which one fan is used.

Eighth Embodiment

FIGS. 9(a) and 9(b) are diagrams of a rotary electric machine according to an eighth embodiment.

The rotary electric machine according to the eighth embodiment includes stator radial ducts 18, which are provided at a middle portion of a stator 3 of the rotary electric machine according to the seventh embodiment illustrated in FIG. 8 and extend from a gap 12 in a radial direction through to the outer periphery. The rotary electric machine according to the eighth embodiment also includes forced draft fans 16a and 16b at the inner periphery side of both heat exchangers 15a and 15b. The outputs (air delivery quantities) of the two forced draft fans 16a and 16b and the cooling capacities of the two heat exchangers 15a and 15b are designed to be substantially similar, respectively. In addition, air guiding plates 14a and 14b, which are funnel like as described above, are provided between the opposing end surfaces of the stator 3 and edges of the outer peripheries of the heat exchangers 15a and 15b, respectively.

The stator radial ducts 18 function as circulating paths P5 in the rotary electric machine. In the rotary electric machine with the arrangement as described above, the air is forced by the forced draft fans 16a and 16b into the gap 12 from its both sides in an axial direction toward the middle portion, and passes through the stator radial ducts 18 (circulating paths P5), which penetrate the stator 3 at the middle portion in the radial direction, to be guided to a circulating path P3. An air circulating passage is formed, in which the air is divided into two in the circulating path P3 and the divided air flows each pass through the heat exchangers 15a and 15b in circulating routes P2 and P4 and are sent by the forced draft fans 16a and 16b into the gap 12 (circulating path P1) again.

FIG. 9(b) is a schematic sectional view taken from FIG. 9(a) along a plane perpendicular to the axial direction at line D-D of the rotary electric machine 1, with only part of the stator core 3 enlarged to facilitate understanding of the arrangement.

The stator core has a plurality of teeth 19 and slots 20 corresponding to the number of magnetic poles of the rotary electric machine. Coils (winding wires) 5 are placed in the slots 20. The stator radial ducts 18 illustrated at the middle portion of the stator 3 in FIG. 9(a) are provided in the teeth 19.

Although a stator radial duct 18 is provided for every tooth 19 at the axially middle portion of the stator 3 in FIG. 9(b), any multiple numbers of stator radial ducts 18 may be provided as long as the radial ducts are symmetric with respect to a rotating shaft as illustrated in FIG. 9(a). The stator radial ducts 18 are provided symmetrically with respect to the rotating shaft in order to avoid interference with the symmetry of magnetic properties of the magnetic poles of the stator 3.

Note that the stator radial ducts 18 may each have a rectangular or circular section.

When compared with the rotary electric machines according to the first to seventh embodiments, the rotary electric machine according to the eighth embodiment described above allows the cooled air flowing in the stator radial ducts 18 of the stator core to cool the stator 3 further and thereby cools permanent magnets 7 that are adjacent to the stator 9 with the gap 12 therebetween.

Ninth Embodiment

FIGS. 10(a) and 10(b) are diagrams of a rotary electric machine according to a ninth embodiment.

The rotary electric machine according to the ninth embodiment includes circulation of the cooled air inside the rotor 9 of the rotary electric machine according to the eighth embodiment, so that cooling efficiency is improved.

As illustrated in FIGS. 10(a) and 10(b), the rotary electric machine according to the ninth embodiment includes a rotor axial duct 21 along an axis direction of a rotor 9 in order to cool the outer periphery of a rotating shaft 10. Although the rotating shaft 10 is illustrated in FIG. 10(a) for convenience as though the rotating shaft 10 is inserted through the rotor axial duct 21, the rotor axial duct 21 is actually formed by penetrating a rotor core 8 between the rotating shaft 10 and the rotor core 8 in the axial direction as illustrated in FIG. 10(b).

In addition, radial ducts 22, which penetrate the rotor core 8 in a radial direction, are provided at a middle portion of the rotor core 8. The rotor axial duct 21 and the rotor radial ducts 22 are in communication. The rotor axial duct 21 and the rotor radial ducts 22 function as air circulating paths P6 and P7, respectively, together with circulating paths P1 to P4 and a circulating path P5 inside the rotary electric machine. In other words, the rotor 9 has a plurality of rotor radial ducts 22, which is formed at the axially middle portion of a gap 12 toward an inner diameter side, and the rotor axial duct 21, which extends from both end surfaces of the rotor 9 in the rotating shaft direction and is in communication with the rotor radial ducts 22.

Note that the rotor core 8 is joined with the rotating shaft 10 through spiders 23 as illustrated in FIG. 11(b) at a location other than the middle of the stator core 8 where the radial ducts 22 are provided. That is, the rotor core 8 is hollow at a middle, and the rotor core is linked to the rotating shaft 10 with the spiders 23.

The penetrating locations of the radial ducts 22 will now be described with reference to FIG. 10(b). FIG. 10(b) is an enlarged sectional view taken from the rotor 9 in FIG. 10(a) along a plane perpendicular to the axial direction at line E-E.

Permanent magnets 7 each have a long size in the axial direction and embedded in the rotor core 8 near the outer periphery, and the number of permanent magnets 7 corresponds to the number of magnetic poles of the rotary electric machine. One or two permanent magnets are provided for one magnetic pole. An example arrangement with the permanent magnets 7 arranged at regular intervals is illustrated in FIG. 10(b) to simplify the description. Actual intervals of the permanent magnets 7 depend on the design of the rotor, and a skew arrangement in which the magnets extend diagonally with respect to the axial direction may be employed.

As illustrated in FIG. 10(b), the rotary electric machine according to the ninth embodiment has rotor radial ducts 22A that penetrate the permanent magnets 7 and rotor radial ducts 22B that penetrate the stator at portions where the permanent magnets 7 are not placed.

Here, as illustrated in FIG. 10(b), the rotor radial ducts 22B may penetrate the permanent magnets, and also, conversely, the permanent magnets may be sectioned at locations of the rotor radial ducts 22. In this case, the permanent magnets that are segmented into two pieces in the axial direction are embedded near a surface of the rotor core 9 in the axial direction.

FIGS. 11(a) and 11(b) are external views of the rotor 9 illustrated in FIGS. 10(a) and 10(b) to facilitate understanding of the arrangement of the rotor radial ducts 22. FIG. 11(a) is an external view of the rotor 9 observed from a direction orthogonal to the axial direction, with a plurality of narrow rectangular openings in the outer periphery illustrated. These rectangular openings are outlets of the rotor radial ducts 22 and face the gap 12 illustrated in FIGS. 10(a) and 10(b). Here, the sections of the rotor radial ducts 22 may be each shaped into a rectangle as illustrated in FIG. 11(a) or may be of a shape other than a rectangle, such as a circle. In the place of the radial ducts each having a rectangular section as illustrated in FIG. 11(a), rectangular radial ducts each having a smaller section may be provided. Similarly, in the place of the radial ducts with non-rectangular sections, such as circular sections, radial ducts with smaller sections may be provided.

FIG. 11(b) is a diagram of the rotor illustrated in FIG. 11(a) observed from the axial direction, with the spiders 23, which join the rotating shaft 10 and the rotor core 8, illustrated at a center portion of the rotor.

Modification of Ninth Embodiment

The ninth embodiment may be modified as described hereinafter.

Although a space between the rotor core 8, which is hollow at the center in the axial direction, and the rotating shaft 10 constitutes the rotor axial duct 21 in the ninth embodiment, a plurality of rotor axial ducts 24 may be provided in a rotor core 8 near the rotating shaft 10 such that the rotor axial ducts are in communication with rotor radial ducts 25.

Figure 12:
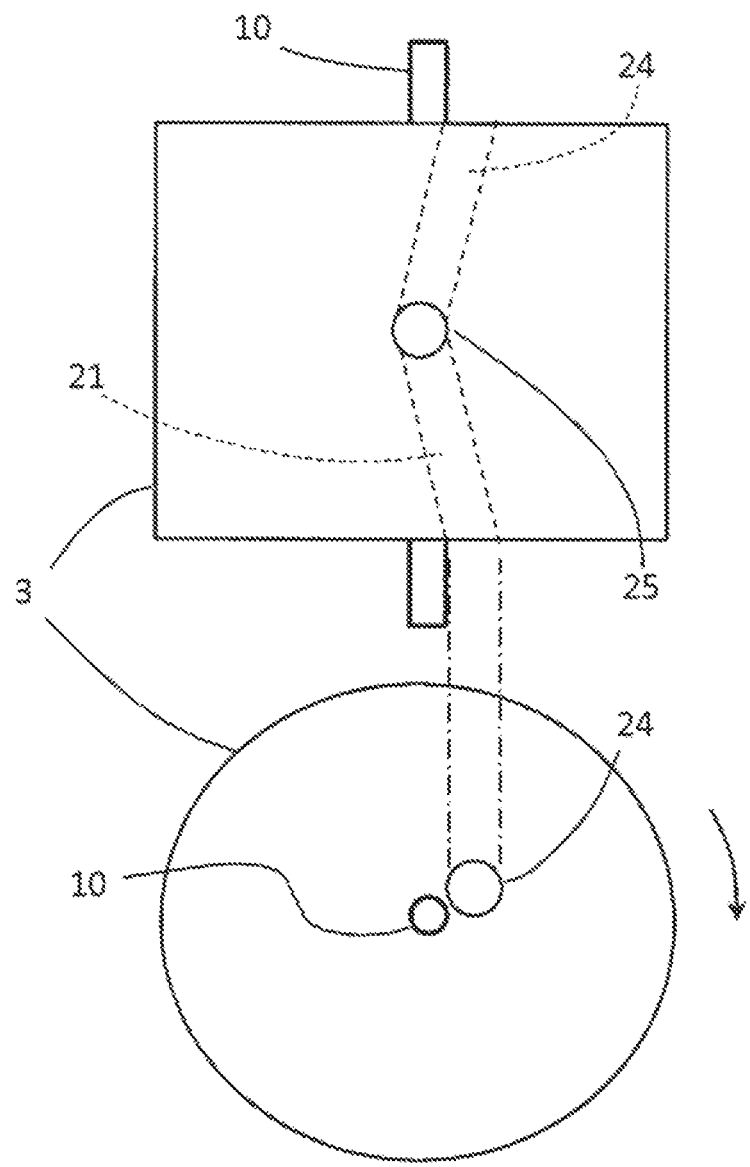
FIG. 12 is a schematic view of example axial ducts (a modification of the tenth embodiment) having a different arrangement from the axial duct 21 illustrated in FIGS. 10(a) and 10(b).

As illustrated in FIG. 12, the rotor axial duct 21 may be provided so as to extend diagonally from an opening in an end surface of the rotor to a connection to the rotor radial ducts 25. The rotor axial ducts 24 provided diagonally may bring about an effect of allowing the cooled air therein due to rotation.

Although one each of the rotor radial ducts 25 and the rotor axial ducts 24 is illustrated in FIG. 12 to facilitate viewing, the plurality of rotor radial ducts 25 and the plurality of rotor axial ducts 24 are actually provided in consideration of the rotation balance of the rotor 9 and the equalization of magnetic pole properties. For example, one or more rotor radial ducts 25 and rotor axial ducts 24 may be provided for one magnetic pole of the rotor 9. Furthermore, the rotor radial ducts 25 and the rotor axial ducts 24 may be in mutual communication.

Tenth Embodiment

FIG. 13(a) is a diagram of a rotary electric machine according to a tenth embodiment.

As illustrated in FIG. 13(a), the rotary electric machine according to the tenth embodiment includes a split-core type stator, which is the stator 3 segmented into two stators 3a and 3b, and a split-core type rotor, which is the rotor 9 segmented into two rotors 9a and 9b, and allows the cooled air to flow between the two stators 3a and 3b and between the two rotors 9a and 9b. The two rotors 3a and 3b are each joined to a rotating shaft 10 with spiders similarly to the case illustrated in FIGS. 11(a) and 11(b).

A stator radial duct structure 28, which is like an annular ring, as illustrated in FIG. 13(b), is provided between the two stators 3a and 3b. A rotor radial duct structure 29, which is like an annular ring, as illustrated in FIG. 13(c), is also provided between the two rotors 9a and 9b.

The stator radial duct structure 28 illustrated in FIG. 13(b) includes, for example, two annular-ring like metal plates 28a and 28b, and a plurality of metallic ribs 28c, called a duct piece, for keeping an interval between the two annular-ring like metal plates. Duct spaces 28d, which are spaces between the ribs 28c, constitute a space structure that penetrates the stator radial duct structure 28 from a side at which the stator radial duct structure 28 faces a gap 12 at an axially middle portion toward the outside in a radial direction.

The rotor radial duct structure 29 illustrated in FIG. 13(c) includes, for example, two annular-ring like metal plates 29a and 29b, and a plurality of metallic ribs 29c, called a duct piece, for keeping an interval between the two annular-ring like metal plates. Similarly to the stator radial duct structure 28 described above, duct spaces 29d, which are spaces between the ribs 29c, constitute a space structure that penetrates the stator radial duct structure 29 from a rotating shaft side toward the outside in the radial direction.

In other words, these radial duct structures 28 and 29 provides an arrangement that resembles a large number of the stator radial ducts and the rotor radial ducts, described in the ninth embodiment, placed from the rotating shaft side toward the outside in the radial direction.

The radial duct structures 28 and 29 are formed with a metal with good thermal conductivity characteristics as described above, and the metal preferably has magnetic permeability approximately similar to or below that of a metal material used for the stator and the rotor in order to avoid influence on the performance of the rotary electric machine. The stator radial duct structure 28 is secured between the stators 3a and 3b, and the rotor radial duct structure is secured between the rotors 9a and 9b. For example, the radial duct structures 28 and 29 are welded to the stator and the rotor, respectively. Hence, when the stator or the rotor is made with iron, it is preferable that the radial duct structures 28 and 29 are also made with iron having similar properties from the viewpoint of weldability and magnetism.

Meanwhile, it is possible to fabricate the radial duct structures 28 and 29 with a non-magnetic material or a non-metal with good thermal conductivity characteristics by providing sufficiently robust joining through welding or other processes for the stator or the rotor.

In comparison with the flow rate of the cooled air passing through the stator radial ducts 18 and the rotor radial ducts 22 in the ninth embodiment, the tenth embodiment allows an increased amount of the cooled air to flow between the cores of the stators 3a and 3b and between the cores of the rotors 9a and 9b, and thus, the rotor 9 is cooled further efficiently in comparison with the ninth embodiment.

Note that, when the stator 3 and the rotor each include more segmented cores, the radial duct structures 28 and 29 may be provided between two segmented cores of the stator or the rotor.

Eleventh Embodiment

Figure 14:
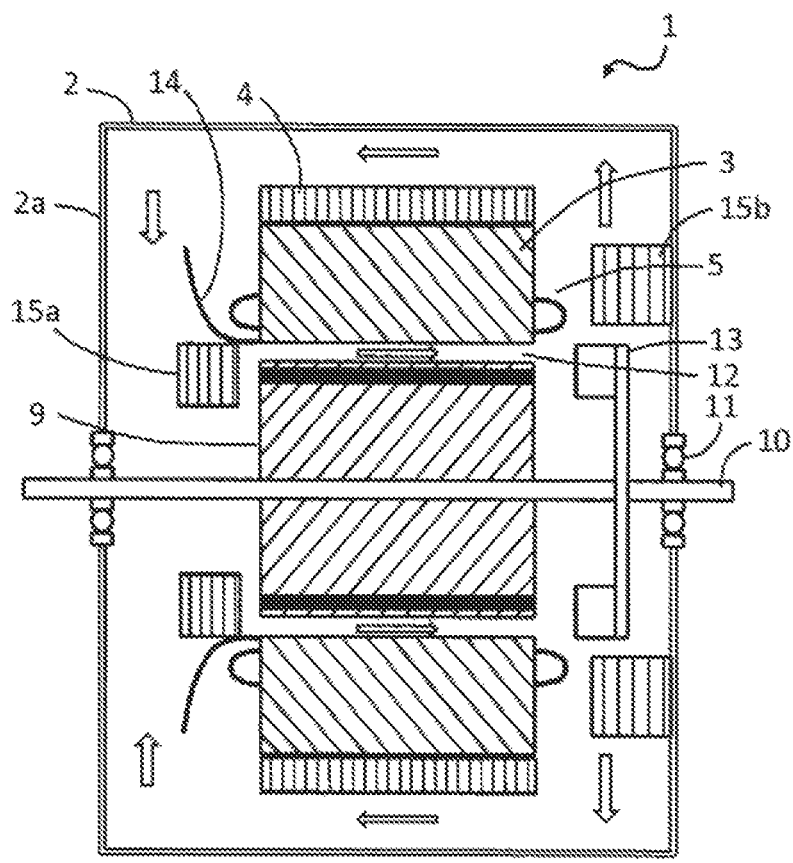
FIG. 14 is a schematic view of a rotary electric machine according to an eleventh embodiment of the present invention.

FIG. 14 is a diagram of a rotary electric machine according to an eleventh embodiment.

As illustrated in FIG. 14, the rotary electric machine according to the eleventh embodiment includes a heat exchanger 15a secured to, instead of a front bracket 2a, an air guiding plate 14 provided on a stator end surface. The heat exchanger 15a is located near a rotor 9 and a gap 12. The heat exchanger 15a is connected to a pipe, not shown, so as to be supplied with a cooling medium that is cooled and supplied from the outside of the rotary electric machine 1.

The heat exchanger 15a according to the eleventh embodiment is also formed into an annular shape, and has an inlet and an outlet of the air at an outer peripheral surface and an inner peripheral surface, respectively. The outlet of the air is formed on an end surface, facing the rotor, of the annular body.

In the rotary electric machine according to the eleventh embodiment, the distance from the cooled-air outlet of the heat exchanger 15a to a cooled-air inlet of the gap 12 can be shorter than those of the rotary electric machines according to other embodiments, which can introduce the air cooled by the heat exchanger 15a to the gap 12 without lowering the air temperature, thereby allowing the rotor 9 to be cooled further efficiently.

Twelfth Embodiment

FIGS. 15(a) and 15(b) are diagrams of a rotary electric machine according to a twelfth embodiment.

The rotary electric machines according to the first to eleventh embodiments each include a fan provided at the rotating shaft 10 to circulate the air inside the rotary electric machine. As illustrated in FIG. 15(a), the rotary electric machine according to the twelfth embodiment has an arrangement that allows a fan 26, which is driven by an external fan motor 27 and is located at the outer periphery side of a stator, to circulate the inside air in a housing 2. FIG. 15(b) is a sectional view of the rotary electric machine illustrated in FIG. 15(a) along a plane perpendicular to an axial direction at line F-F.

It is preferable that a plurality of such fans is provided symmetrically with respect to the shaft for smooth circulation of the inside air. Alternatively, when, for example, there is only one fan of this type provided, the shape of an air guiding plate is formed such that the inside air is circulated uniformly inside the rotary electric machine.

Although the first to twelfth embodiments have been described above as permanent-magnet type rotary electric machines of the inner rotor type, the placement of a heat exchanger capable of cooling a high temperature portion may be applied to, not just permanent-magnet type rotary electric machines, but all rotary electric machines, such as an induction machine, a synchronous machine, and an AC excited synchronous machine. Hence, the present invention may be applied to a rotary electric machine of the outer rotor type.

Although various embodiments and modifications have been described above, the present invention is not limited thereto. Any other embodiments contemplated in a range of technical ideas of the present invention are included in the range of the present invention. In particular, various embodiments described above may be combined to provide diverse embodiments that can be implemented.

The invention claimed is:

1. A rotary electric machine, comprising:
a stator including a stator core and stator coils;
a rotor provided rotatably with a gap to the stator;
a housing that stores the stator and the rotor;
a fan that circulates air inside the housing through the gap in the housing;
a heat exchanger that cools the air circulated by the fan; and
an air guiding plate including an air guiding route formed therein for guiding the air cooled by the heat exchanger such that the cooled air flows into the gap without coming into contact with the stator coils, the air guiding plate extending from an edge of the heat exchanger to an edge of the stator adjacent to the gap.

2. The rotary electric machine according to claim 1, wherein
the housing includes a tubular body, and a front bracket and a rear bracket that each cover an end of the body and support an end of the rotating shaft, and
the heat exchanger is attached so as to be in contact with the front bracket or the rear bracket and is cooled by outside air through the front bracket or the rear bracket in contact with the heat exchanger.

3. The rotary electric machine according to claim 2, wherein
the air guiding plate is placed at a cooled-air inlet of the gap such that an end portion of the stator coils is outside the air guiding route.

4. The rotary electric machine according to claim 3, wherein
the air guiding plate is placed between a cooled-air outlet of the heat exchanger and an end surface of the stator core such that the end portion of the stator coils is outside the air guiding route.

5. The rotary electric machine according to claim 4, wherein
the rotor is placed inside the stator, and
the heat exchanger is an annular body, and this annular heat exchanger is placed on the front bracket or the rear bracket concentrically with a rotating axis of the rotor, and the cooled-air outlet has an opening in an end surface, facing the stator, of the annular heat exchanger, and
the air guiding plate is formed in a funnel shape such that the cooled air flowing from the cooled-air outlet is guided by the air guiding route in a direction along the rotating axis to flow into the gap.

6. The rotary electric machine according to claim 1, further comprising a rotating shaft connected to the rotor, wherein
the fan is mounted on the rotating shaft.

7. The rotary electric machine according to claim 6, wherein
the fan is a forced draft fan or a centrifugal fan, either of which is mounted on one end of the rotating shaft.

8. The rotary electric machine according to claim 6, wherein
the fan includes a first fan placed at one end of the rotating shaft and a second fan placed at another end of the rotating shaft, and one of the first and second sending fans is a forced draft fan, and another is a centrifugal fan.

9. The rotary electric machine according to claim 1, wherein
the heat exchanger includes first and second heat exchangers each provided at an end of the rotating shaft.

10. The rotary electric machine according to claim 9, wherein
the stator includes a plurality of stator radial ducts that extends from an axially middle portion of the gap in a radial direction through to a peripheral surface, and
the fan includes first and second forced draft fans each provided at an end of the rotating shaft.

11. The rotary electric machine according to claim 10, wherein
the rotor includes a plurality of rotor radial ducts formed from the axially middle portion of the gap toward an inner diameter direction and a rotor axial duct that extends from both end surfaces of the rotor in a rotating shaft direction and is in communication with the rotor radial ducts.

12. The rotary electricity according to claim 9, wherein
the stator includes a plurality of stator split cores,
the rotor includes a plurality of rotor split cores,
a stator radial duct structure is provided between two consecutive stator split cores of the plurality of stator split cores, the stator radial duct structure including a plurality of duct spaces that penetrates the stator from an axially middle portion of the gap in a radial direction, a rotor radial duct structure is provided between two consecutive rotor split cores of the plurality of rotor split cores, the rotor radial duct structure including a plurality of duct spaces that penetrates the rotor from an axially middle portion of the rotor axial duct in the radial direction, and the fan includes first and second forced draft fans each provided at an end of the rotating shaft.

13. The rotary electric machine according to claim 1, wherein the fan is provided at an outer periphery side of the stator, and is driven to rotate from an outside of the rotary electric machine.

14. The rotary electric machine according to claim 1, wherein the heat exchanger performs heat exchanging between a cooling medium supplied from an outside of the rotary electric machine and the air inside the housing.

15. The rotary electric machine according to claim 14, wherein the housing includes a tubular body, and a front bracket and a rear bracket that each cover an end of the body, and the heat exchanger is not in contact with the front bracket or the rear bracket and is provided in proximity to the rotor.

* * * * *